(12) United States Patent
Burton et al.

(10) Patent No.: US 9,290,398 B2
(45) Date of Patent: Mar. 22, 2016

(54) WATER AERATION SYSTEM

(71) Applicant: Linne Industries LLC, Newark, DE (US)

(72) Inventors: Craig Burton, Newark, DE (US); Sandra Burton, Newark, DE (US)

(73) Assignee: Linne Industries LLC, Newark, DE (US)

( * ) Notice: Subject to any disclaimer, the term of this patent is extended or adjusted under 35 U.S.C. 154(b) by 197 days.

(21) Appl. No.: 14/228,864

(22) Filed: Mar. 28, 2014

(65) Prior Publication Data

US 2015/0274559 A1 Oct. 1, 2015

(51) Int. Cl.
C02F 7/00 (2006.01)
B01F 3/04 (2006.01)
C02F 1/74 (2006.01)
A01K 63/04 (2006.01)

(52) U.S. Cl.
CPC ............ *C02F 1/74* (2013.01); *A01K 63/042* (2013.01); *B01F 3/04106* (2013.01); *B01F 3/04241* (2013.01); *B01F 3/04248* (2013.01); *C02F 7/00* (2013.01); *B01F 2003/04319* (2013.01); *C02F 2201/009* (2013.01)

(58) Field of Classification Search
CPC ..... C02F 7/00; B01F 3/04106; B01F 3/04241
USPC .................. 261/77, 121.1; 210/220
See application file for complete search history.

(56) References Cited

U.S. PATENT DOCUMENTS

| 4,657,675 | A | 4/1987 | Zan |
| 4,906,359 | A | 3/1990 | Cox, Jr. |
| 6,428,694 | B1 | 8/2002 | Brown |
| 6,676,837 | B2 | 1/2004 | Keeton, Jr. |
| 6,805,798 | B2 | 10/2004 | Kerfoot |
| 7,517,460 | B2 | 4/2009 | Tormaschy et al. |
| 7,641,792 | B2 | 1/2010 | Tormaschy et al. |
| 7,670,044 | B2 | 3/2010 | Tormaschy et al. |
| 7,789,553 | B2 | 9/2010 | Tormaschy et al. |
| 7,798,784 | B2 | 9/2010 | Tormaschy et al. |

(Continued)

FOREIGN PATENT DOCUMENTS

| DE | 29806696 U1 | 11/1998 |
| JP | S5442845 | 4/1979 |

OTHER PUBLICATIONS

International Search Report issued May 7, 2015 in Int'l Application No. PCT/US2015/019096.

*Primary Examiner* — Robert A Hopkins
(74) *Attorney, Agent, or Firm* — Panitch Schwarze Belisario & Nadel LLP

(57) ABSTRACT

A water aeration system encases an air pump and a solar power controller in an encasement structure with one or more air permeable sidewalls. The encasement structure is mounted at or near a top end of a mounting pole. A solar panel is mounted directly or indirectly to the encasement or to the mounting pole at or near the top end of the mounting pole. An air conduit is threaded through a hollow channel in the mounting pole, and then underground and/or under water for joining to an immersed diffuser. The water aeration system operates without a battery or energy accumulator, and is tamper-resistant. The air pump and controller are inside the encasement structure, the solar panel and encasement structure are mounted several feet above the ground surface, and the conduit between the pump and the diffuser is held inside the mounting pole.

14 Claims, 3 Drawing Sheets

(56) References Cited

U.S. PATENT DOCUMENTS

| | | |
|---|---|---|
| 7,850,443 B2 | 12/2010 | Eigler |
| 7,906,017 B2 | 3/2011 | Tormaschy et al. |
| 8,057,091 B2 | 11/2011 | Tormaschy et al. |
| 8,226,292 B1 | 7/2012 | Walter et al. |
| 8,500,321 B2 | 8/2013 | Simnioniw et al. |
| 8,529,764 B2 | 9/2013 | Keeton |
| 2010/0039061 A1 | 2/2010 | Rosenbaum |
| 2013/0292858 A1 | 11/2013 | Keeton, Jr. |

WATER AERATION SYSTEM

BACKGROUND

The field of the present invention relates to solar powered water aeration systems, particularly with tamper resistant, extended life operation.

To sustain marine life in lakes, lagoons, ponds and other bodies of water, a sufficient quantity of oxygen in the water is essential. An increase in organic matter production by algae and plants creates greater demand on dissolved oxygen in the water as the organic matter decomposes. The deeper waters in a pond or other body of water may be depleted of oxygen and thus destroy fish habitat. Serious oxygen deficiencies are more likely to occur where there is a combination of high temperature and little wind, along with decaying organic materials. In summer months, storms with high winds may cause a pond to turn over and mix oxygen-deficient water from the bottom of the pond with the surface water, thus further depleting the oxygen supply. During winter, ice and snow covering the water body may also cause oxygen levels to lower.

Oxygen can be restored to a body of water by injecting dissolved oxygen at predetermined depths (subsurface aeration) or by pumping water at the surface as a fountain (surface aeration). Energy efficient means for restoring oxygen continue to be sought.

Various techniques for introducing oxygen to ponds by subsurface aeration with benefit of solar powered equipment have been disclosed in the prior art. As one example, in U.S. Pat. No. 4,906,359 a solar activated water aeration station provides a floating base on which a pump and pump motor and a solar panel for energizing the motor are mounted. An air tube with openings at its distal end extends from the pump and floating base into the water to release air bubbles into the water.

As another example, in U.S. Pat. No. 6,676,837 a solar aeration system immerses a diffuser into a pond. A pump installed in a control box on a ground surface outside of the pond is powered via a solar panel that is mounted to a post held in the ground surface.

Such prior solar activated subsurface aeration systems suffer certain drawbacks. Floating systems are difficult to install and difficult to access for maintenance. Ground mounted systems are subject to damage from tampering, and air tubes or conduits can be harmed by lawn maintenance equipment. Many prior systems include batteries or energy accumulators in association with the solar panels. Such batteries or energy accumulators have limited service life and often need repair. Some prior systems include fans to cool pump motors that not only deplete energy from the battery or energy accumulator, but can be clogged by debris or suffer failure due to wear of moving parts, such as bearings and blades. Improvements to solar activated water aeration systems to overcome these drawbacks continue to be sought.

SUMMARY

In one aspect of the invention, a water aeration system has a mounting pole defining an inner channel substantially along its length. The bottom end of the mounting pole is adapted for insertion into a ground or a footing for establishing the mounting pole upright with its top end above the ground or footing surface. Preferably the mounting pole has a length of about eight feet, with a portion of the length of the pole integrated into a sufficient foundation to bear the wind loads found in the installation zone.

An encasement is mounted, at or near the top end of the mounting pole. The encasement defines an internal space in which an air pump and a solar power controller are housed. The encasement has at least one air permeable wall, preferably at least two air permeable walls. The air permeable wall(s) may be a screen, a mesh or a wire mesh.

A conduit is supplied to receive air pumped into the conduit by the air pump. The conduit is connected at one end to the air pump and at its opposite end to at least one diffuser. At least a portion of its length of the conduit is positioned within the channel of the mounting pole. Another portion of the length of the conduit is immersed in the water in which the diffuser is immersed. Some portion of the conduit may be buried from the point it exits the mounting pole and enters the water. Preferably, no portion of the length of the conduit is above ground or out of water except for the portion(s) positioned within the channel of the mounting pole or inside the encasement.

A solar panel is directly or indirectly joined to the encasement or the mounting pole such that the solar panel is at or near the top end of the mounting pole. The solar panel generates power that may be converted to current for driving the air pump. A controller associated with the solar panel converts photovoltaic electrical power from the solar panel to current for driving the air pump. Preferably, the controller is encased in the same internal volume of the encasement structure with the air pump.

The subsurface aeration diffuser or diffusers is/are submerged into a body of water to be aerated, such as, but not limited to, a pond or fish hatchery.

Preferably, the water aeration system is operated without a battery or other energy accumulator.

In a second aspect of the invention, a pole-mounted enclosure for a solar-powered water aeration system has a mounting pole defining an inner channel substantially along its length and having a top end and a bottom end, with the bottom end adapted for insertion into a ground or a footing for establishing the mounting pole upright with its top end above the ground or footing surface. An encasement structure is mounted at or near the top end of the mounting pole. The encasement defines an internal space adapted for holding an air pump or source of compressed air, and has at least one air permeable wall. One or more brackets are joined either to the encasement or at or near the top of the mounting pole that are adapted to join a solar panel to the pole-mounted enclosure.

A conduit for pumped air is adapted for connection to the air pump or source of compressed air at a first end and adapted for connection at its opposite end to at least one diffuser. The conduit has a portion of its length positioned within the channel of the mounting pole and a portion of its length immersible in water in which the diffuser may be immersed.

One or more brackets are provided for mounting at least one solar panel to the encasement or the mounting pole at or near the top end of the mounting pole.

A more complete understanding of the invention, including an understanding of the various configurations of mounting clips and decorative mounting articles, will be afforded to those skilled in the art, as well as a realization of additional advantages and objects thereof, by consideration of the followed detailed description. Reference will be made to the appended drawing sheets which will first be described briefly.

BRIEF DESCRIPTION OF THE DRAWINGS

The drawings described herein are for illustrative purposes only and are not intended to limit the scope of the present disclosure. In the drawings, wherein like reference numerals refer to similar components.

DETAILED DESCRIPTION

Figure 1:
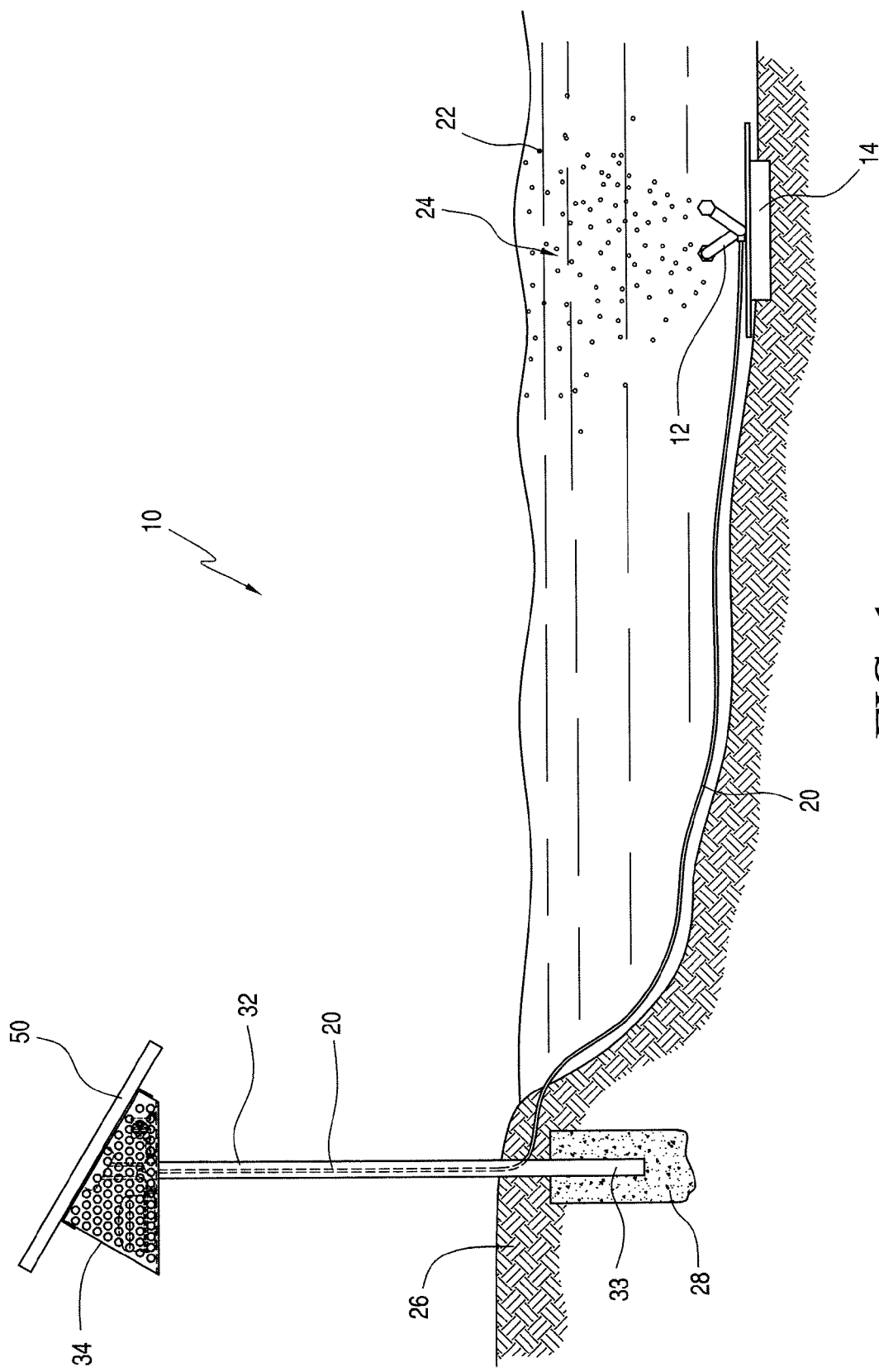
FIG. 1 is a schematic view of an embodiment of a solar powered water aeration system according to the invention.
Figure 2:
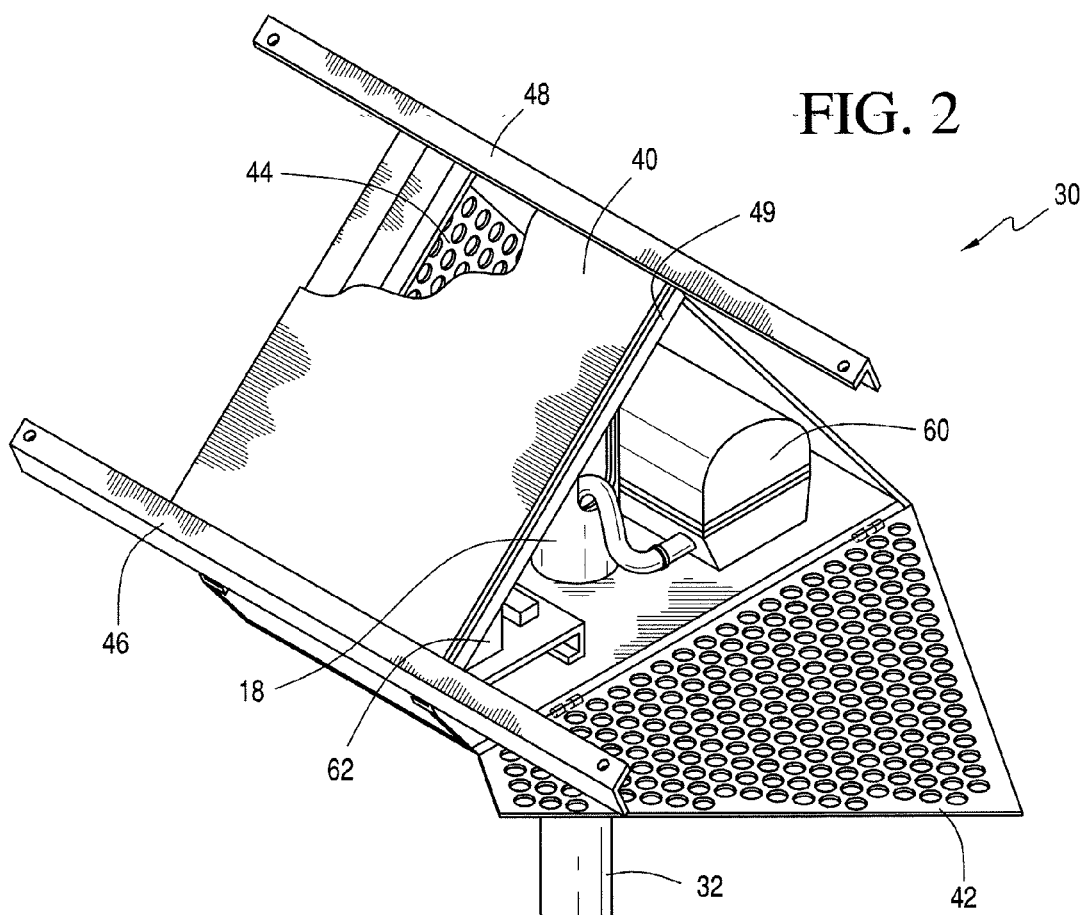
FIG. 2 is a right front perspective view of a mounting pole and encasement for the pump and controller of the water aeration system of FIG. 1, showing a side panel in an open configuration for access to the encasement interior.
Figure 3:
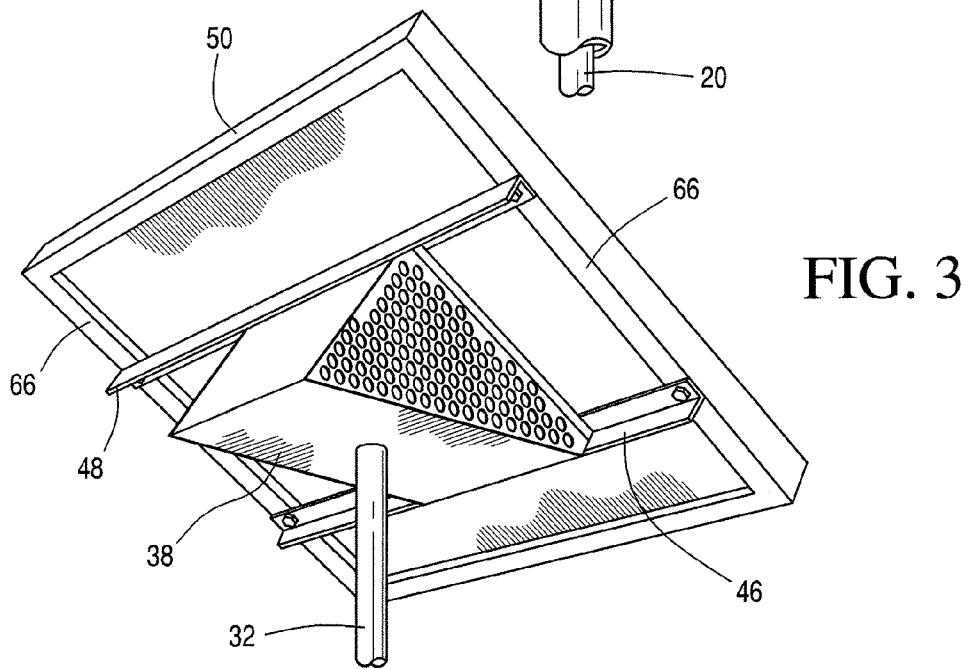
FIG. 3 is a left rear perspective view of the mounting pole and encasement for the pump and controller, also including a solar panel mounted to the encasement, of the water aeration system of FIG. 1.
Figure 4:
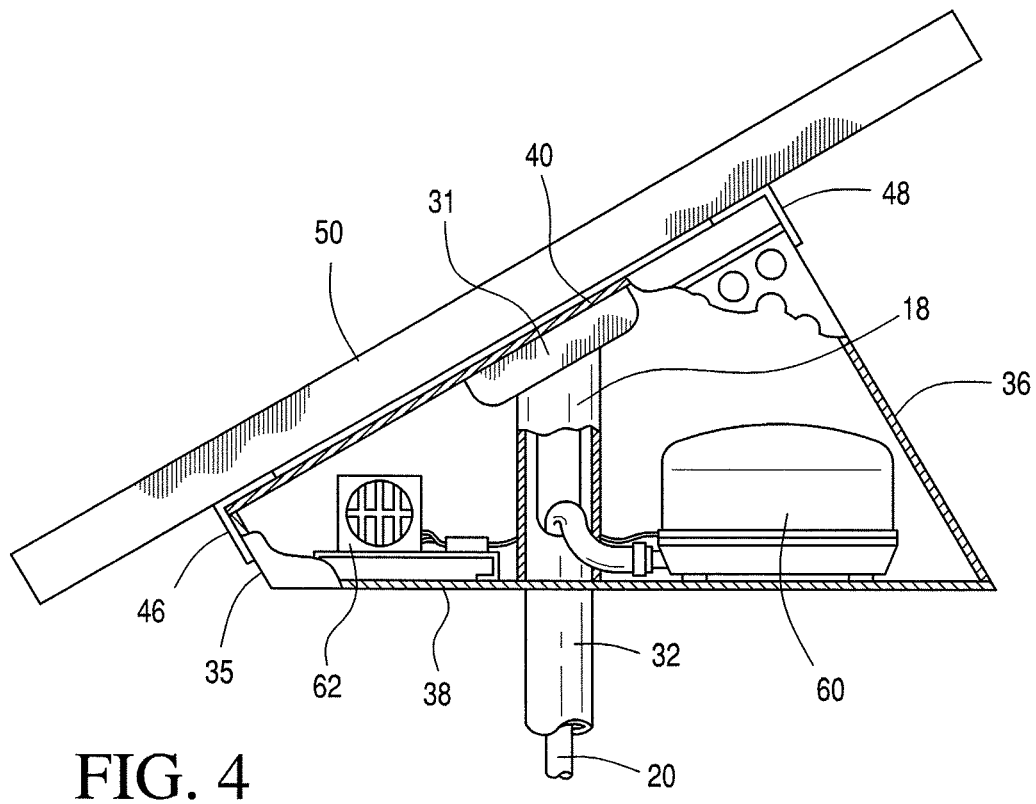
FIG. 4 is a partial cross-sectional view of the encasement showing the encasement interior.
Figure 5:
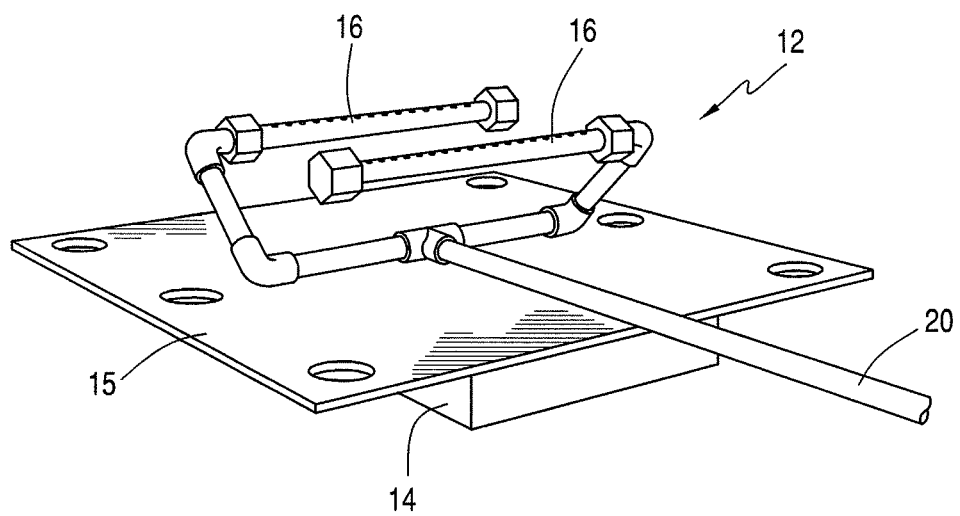
FIG. 5 is a right front perspective view of the diffuser and diffuser platform of the solar powered aeration system of FIG. 1.

Turning in detail to the drawings, FIGS. 1-5 show an embodiment of a water aeration system 10 and its components. Referring first to FIGS. 1 and 5, the water aeration system 10 includes an immersed fine pore tube diffuser 12 that is mounted to a mounting 15 on a diffuser platform or tray 14. The diffuser 12 and diffuser platform or tray 14 are immersed in a body of water, such as a pond 24 to be aerated.

Referring now to FIG. 5, in this embodiment, the diffuser 14 includes one or more diffuser tubes or arms 16 that are perforated or pierced to form holes that permit fluids, such as air or other gases, to flow out of the diffuser tubes or arms 16 into the body of water. As the air escapes from or flows out of the diffuser tubes or arms 16, air bubbles 22 form in the water and serve to transfer oxygen to the water to aerate the pond 24.

Various diffusers or bubblers are known in the market. One exemplary diffuser, as shown in FIGS. 1 and 5, is a JETFLEX tube diffuser available from Jäger Umwelt Technik GmbH Co. KG. Diffusers are available in the shape of discs, plates, tubes or hoses constructed from glass-bonded silica, porous ceramic, PVC or perforated membranes or conduits made from EPDM (ethylene propylene diene monomer) rubber and/or a slit silicone sheet. Air pumped through the diffuser membranes is released into the water. The bubbles released from the diffuser may be fine bubbles, with diameters smaller than 3 mm, or larger bubbles with diameters greater than 3 mm. As a general rule, smaller bubbles and a deeper release point will generate a greater oxygen transfer rate into the water. Other tube diffusers or disk diffusers may be secured to diffuser platform or tray 14 as desired. The invention is not limited to any one specific diffuser or bubbler.

Platform or tray 14 preferably is formed of a corrosion-resistant material, such as but not limited to stainless steel.

The diffuser 12 emits pumped air that is transmitted through an air conduit 20 from a pump 60 to the diffuser 12. The pump 60 is mounted in an encasement structure 34 as described further herein.

Referring to FIGS. 1-4, the solar power assembly 30 includes an encasement structure 34 that is secured to a top 31 of a mounting pole 32. A receiver cylinder 18 is integrated into the encasement structure 34. The receiver cylinder 18 receives the top 31 of the pole 32 to secure the top 31 to the encasement structure 34. The receiver cylinder 18 has an open top end. The receiver cylinder 18 has an internal diameter slightly larger than the external diameter of the top 31 of the pole 32. When the two are joined, the top 31 of the pole 32 goes into the receiver cylinder 18 and then is locked into place, such as with a set screw. This has the advantage of installing the pole such that it is vertical. When the encasement is placed, it can be rotated so that the solar panel faces south when it is installed in the northern hemisphere, and north when it is installed south of the equator.

The mounting pole 32 has a bottom 33 that is held in the ground 26, and preferably is held in association with a footer 28 installed in the ground 26. The mounting pole 32 preferably has a length in the range of 8 to 10 feet. The mounting pole 32 preferably comprises a hollow core or channel therein. In one preferred embodiment, the mounting pole comprises an extruded rust-resistant metal tube or pipe, such as but not limited to a steel alloy or stainless steel or aluminum or an aluminum alloy. A schedule 40 or schedule 80 rigid steel pipe is one exemplary mounting pole.

The encasement structure 34 has a front face 35, a rear face 36, a bottom face 38 and a top face 40. The side panels 42, 44 of the encasement structure 34 comprise an air permeable material, such as a screen or a mesh. The air permeable material permits sufficient air flow into the interior of the encasement structure 34 so that equipment held inside the encasement structure 34 remains at or near ambient temperature. Examples of suitable air permeable materials include but are not limited to metal screen, perforated metal, expanded metal sheet, wire mesh, wire screen, coated wire mesh, coated wire screen, composite material mesh, nylon screen, and moldable material mesh or screen. Preferably, one side panel 42 is joined by hinges to the bottom face 38 so that the side panel 42 may be tilted open for access to the interior space of the encasement structure 34.

The encasement structure 34 may be formed with powder coated sheet steel, or of stainless steel, or aluminum, or plastics (e.g., vacuum molded or injection molded or 3D printed).

A pump 60 is held within the interior space of the encasement structure 34. A controller 62 for converting solar energy to DC or AC current to power the pump 60 also is installed within the interior space of the encasement structure 34. Exemplary controllers 62 that may be used in the water aeration system include: a linear current booster (LCB); a pulse width modulated (PWM) controller; and a maximum power point tracking (MPPT) controller. Known suppliers for LCB controllers include Solar Converters and Sunpumps. Known suppliers for MPPT controllers include Morningstar, Outback, Xantrex and Midnite Solar. Preferably, a quick release internal controller mounting system with an integrated terminal strip electrically connects the controller 62 to the pump 60. The quick release can be decoupled for repair or replacement.

One exemplary pump 60 is a DC-powered linear air pump. One suitable low maintenance, oil free, linear air pump is offered by Alita Industries, Inc. and has a rated performance of 60 liters per minute at 15 kPa. Other suitable pumps include diaphragm or piston pumps with DC motors, particularly those rated for marine or RV or other outdoor use.

An air tube or air conduit 20 is joined at one end to the output of the pump 60 and is joined at its opposite end to the diffuser 12. The air tube or air conduit 20 is threaded through the open top of the receiver cylinder 18 and into the hollow opening of the mounting pole 32 and is held therein. The air tube or air conduit 20 extends substantially along the length of the mounting pole 32, and is then buried under ground 26 to keep the air tube or air conduit 20 secure from tampering or from damage to which it would be subject if it were left exposed along the outside of the mounting pole 32 or on the ground surface 26.

Preferably, the air tube or air conduit 20 is a thick-walled flexible tube that does not float. One exemplary air tube 20 is a Kuri Tec Nautilus air tube from Kuriyama of America, Inc.

A first mounting 46 is joined to the front face 35 of the encasement structure 34. A second mounting 48 is joined to the rear face 36 or the top face 40 of the encasement structure 34. The mountings 46, 48 may comprise brackets that connect to frame beams or sections 66 that hold the edges of a solar panel 50, and rail mountings 49 that engage rear structure of the solar panel. The combination of mountings 46, 48, 49 and beams 66 are used to secure the solar panel 50 to the encasement structure 34 so that the solar panel 50 is mounted above the encasement structure 34. The top 40 of the encasement structure may be in contact with the rear face of the solar panel 50 for added stability in the mounting. In most circumstances, however, a gap is left between the top 40 of the encasement structure and the rear face of the solar panel 50 to permit air flow and convective cooling of the solar panel 50.

The solar panel 50 is directly or indirectly electrically connected to the controller 62. Solar energy collected by the solar panel 50 is converted to DC current that may be used to power motor 60. If desired, an inverter to convert DC current to AC current to power motor 60. Any of the available solar panel technologies can be used with the water aeration system according to the invention, whether monocrystalline, multicrystalline, thin film or any other type.

The receiver cylinder 18 allows for quick and secure installation of panels and components to the mounting pole 32 and air tube 20 with minimal installation tools. The receiver cylinder 18 secures the solar panel 50 and encasement structure 34 combination to the mounting pole. The encasement structure 34 may be rotated on the mounting pole 32 to customize orientation of the system at the mounting site. Once oriented, the encasement structure 34 may be secured to the top of the mounting pole 32 via the receiver cylinder 18 with dual lock bolts (not shown).

We have found that a battery or an energy accumulator is not needed. The pump 60 is powered during those times when there is sufficient daylight for the solar panel 50 to collect solar energy. While the pump is not powered at other times, we have found that daytime only operation of the water aeration system is sufficient to aerate a body of water. In the summer months, when aeration is most important, daylight hours are longer and the water aeration system pumps air to the diffuser for a longer duration. In the winter months, when aeration is still desirable, the water aeration system pumps air to the diffuser for a shorter duration because there are fewer daylight hours. However, we have found such durations to be sufficient during each of these seasons. The output of the solar array has a daily solar rhythm or circadian rhythm that matches the need and capacity for aeration of the pond or other water body for each season during the calendar year.

We have found that a fan to cool the pump is not needed. The air permeable side panels 42, 44 permit sufficient air flow into the encasement structure 34 to maintain ambient temperatures therein. The pump 60, such as a linear air pump, is cooled solely by this air flow through the encasement structure. The natural convective movement of air past the pump is a passive cooling strategy that obviates the need for a motor driven method of moving air (such as a fan).

We have found that mounting the solar panel 50, controller 62 and pump 60 at a sufficient height above the ground prevents damage from tampering. In addition, threading the air conduit or tube 20 from the pump to the diffuser through a hollow channel in the mounting pole 32 protects the air conduit or tube from tampering and from damage that can occur during lawn maintenance. Because the air conduit or tube is not on the ground surface, it is not exposed to possible cutting or other damage from lawn mowers or trimmers, and it is not a tripping hazard to passersby.

Thus, various configurations of solar powered water aeration systems are disclosed. While embodiments of this invention have been shown and described, it will be apparent to those skilled in the art that many more modifications are possible without departing from the inventive concepts herein. The invention, therefore, is not to be restricted except in the spirit of the following claims.

GLOSSARY 10 water aeration system
12 diffuser
14 diffuser platform
15 mounting plate for diffuser
16 diffuser arm
18 receiver cylinder
20 conduit from pump to diffuser
22 air bubbles
24 pond
26 ground
28 footer
30 solar power assembly
31 top of mounting pole
32 hollow mounting pole
33 bottom of mounting pole
34 encasement
35 front face of encasement
36 rear face of encasement
38 bottom of encasement
40 top of encasement
42 side panel of encasement
44 side panel of encasement
46 frame mounting for solar panel
48 frame mounting for solar panel
49 rail mounting for solar panel
50 solar panel
60 air pump
62 solar controller
66 beams holding solar panel

What is claimed is:

1. A water aeration system, comprising:
    a mounting pole defining an inner channel substantially along its length and having a top end and a bottom end, with the bottom end adapted for insertion into a ground or a footing for establishing the mounting pole upright with its top end above the ground or footing surface;
    an encasement mounted at or near the top end of the mounting pole, said encasement defining an internal space, and having at least one air permeable wall;
    an air pump held within the encasement;
    a conduit for air pumped into the conduit by the air pump, said conduit connected at one end to the air pump and at its opposite end adapted to connect to at least one diffuser, wherein said conduit has a portion of its length positioned within the channel of the mounting pole and a portion of its length immersible in the water in which the diffuser is immersed, and wherein no portion of the length of the conduit is above ground or out of water except for the portion(s) positioned within the channel of the mounting pole or inside the encasement; and
    a solar panel directly or indirectly joined to the encasement or the mounting pole such that the solar panel is at or near the top end of the mounting pole, wherein said solar panel generates power that may be converted to current for driving the air pump.

2. The water aeration system of claim 1, further comprising at least one diffuser adapted for submersion into a body of water to be aerated.

3. The water aeration system of claim 2, further comprising a controller associated with the solar panel to convert photovoltaic electrical power from the solar panel to current for driving the air pump.

4. The water aeration system of claim 2, further comprising at least one other air permeable wall opposite the air permeable wall of the encasement.

5. The water aeration system of claim 4, wherein the air permeable walls comprise a material selected from the group consisting of: metal screen, perforated metal, expanded metal sheet, wire mesh, wire screen, coated wire mesh, coated wire screen, composite material mesh, nylon screen, moldable material mesh and moldable material screen.

6. The water aeration system of claim 2, wherein the diffuser is either a coarse bubble or a fine pore subsurface aeration diffuser.

7. The water aeration system of claim 1, wherein the encasement is mounted above a ground surface at a distance of at least about 8 feet.

8. The water aeration system of claim 3, wherein the encasement encloses the air pump and the controller inside the internal space.

9. The water aeration system of claim 2, wherein the system functions without a battery or any other energy accumulator.

10. A pole-mounted enclosure for a solar-powered water aeration system, comprising:
   a mounting pole defining an inner channel substantially along its length and having a top end and a bottom end, with the bottom end adapted for insertion into a ground or a footing for establishing the mounting pole upright with its top end above the ground or footing surface;
   an encasement mounted at or near the top end of the mounting pole, said encasement defining an internal space adapted for holding an air pump or source of compressed air, and having at least one air permeable wall;
   a conduit for pumped air, said conduit adapted for connection to the air pump or source of compressed air at a first end and adapted for connection at its opposite end to at least one diffuser, wherein said conduit has a portion of its length positioned within the channel of the mounting pole and a portion of its length immersible in water in which the diffuser may be immersed; and
   one or more brackets adapted for mounting at least one solar panel to the encasement or the mounting pole at or near the top end of the mounting pole.

11. The pole-mounted enclosure of claim 10, wherein the one or more brackets are joined to the encasement.

12. The pole-mounted enclosure of claim 10, wherein the encasement has at least two air permeable walls.

13. The pole-mounted enclosure of claim 12, wherein the air permeable walls comprise a material selected from the group consisting of: metal screen, perforated metal, expanded metal sheet, wire mesh, wire screen, coated wire mesh, coated wire screen, composite material mesh, nylon screen, moldable material mesh and moldable material screen.

14. The pole-mounted enclosure of claim 10, wherein the mounting pole has a length of at least about 8 feet.

* * * * *